United States Patent
Weng et al.

(10) Patent No.: US 10,564,421 B2
(45) Date of Patent: Feb. 18, 2020

(54) DISPLAY DRIVING DEVICE AND DISPLAY APPARATUS

(71) Applicant: SHARP KABUSHIKI KAISHA, Sakai, Osaka (JP)

(72) Inventors: Hongbing Weng, Sakai (JP); Masaaki Nishio, Sakai (JP); Tatsuhiko Suyama, Sakai (JP); Noriyuki Tanaka, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/147,619

(22) Filed: Sep. 29, 2018

(65) Prior Publication Data
US 2019/0101755 A1   Apr. 4, 2019

(30) Foreign Application Priority Data
Oct. 4, 2017   (JP) .................. 2017-194503

(51) Int. Cl.
*G02B 27/01* (2006.01)
*G09G 3/36* (2006.01)
*G02F 1/1345* (2006.01)
*G09G 3/00* (2006.01)

(52) U.S. Cl.
CPC ....... *G02B 27/017* (2013.01); *G02F 1/13454* (2013.01); *G09G 3/3648* (2013.01); *G09G 3/003* (2013.01); *G09G 3/3688* (2013.01); *G09G 2310/0205* (2013.01); *G09G 2310/0232* (2013.01); *G09G 2310/0264* (2013.01); *G09G 2310/0291* (2013.01); *G09G 2310/0297* (2013.01); *G09G 2330/021* (2013.01)

(58) Field of Classification Search
None
See application file for complete search history.

(56) References Cited

U.S. PATENT DOCUMENTS

| | | | |
|---|---|---|---|
| 6,542,139 B1 * | 4/2003 | Kanno ............... | G09G 3/3677 345/87 |
| 7,248,232 B1 | 7/2007 | Yamazaki et al. | |
| 2006/0022929 A1 * | 2/2006 | Hashimoto .......... | G09G 3/2011 345/96 |
| 2010/0103077 A1 * | 4/2010 | Sugiyama ........... | G02B 27/017 345/8 |

FOREIGN PATENT DOCUMENTS

JP   2000-002856 A   1/2000

* cited by examiner

*Primary Examiner* — Nicholas J Lee
(74) *Attorney, Agent, or Firm* — ScienBiziP, P.C.

(57) ABSTRACT

A display apparatus includes a source driver and a gate driver which drive a display section such that pixel signals are selectively supplied to a plurality of pixels provided in the display section. The display section includes a non-image visual recognition area, in which it is not possible for a visual recognizer to visually recognize an image to be displayed, and an image visual recognition area in which it is possible for the visual recognizer to visually recognize the image to be displayed. The source driver and the gate driver lower a driving rate which drives the non-image visual recognition area further than a driving rate which drives the image visual recognition area.

5 Claims, 9 Drawing Sheets

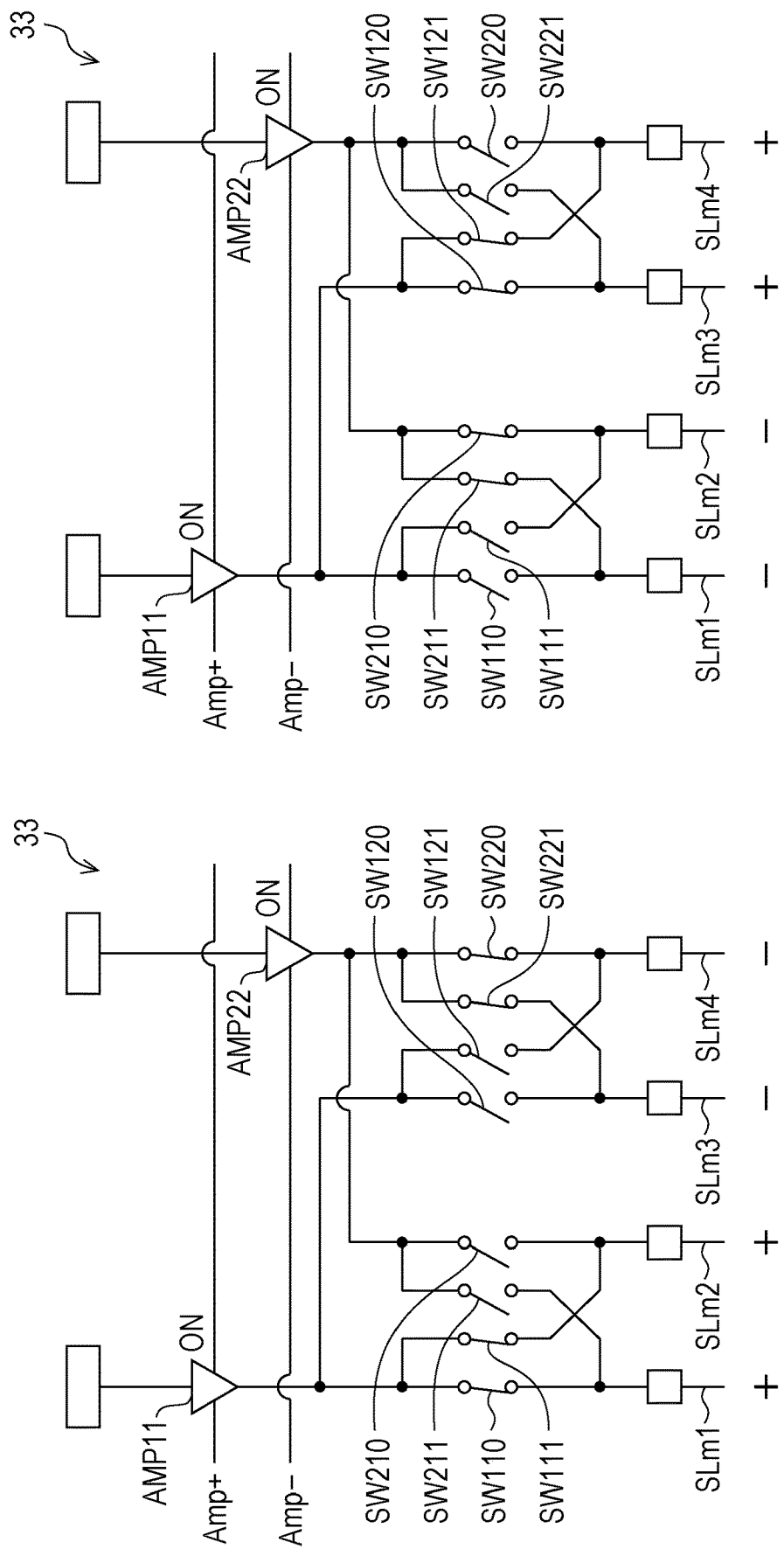

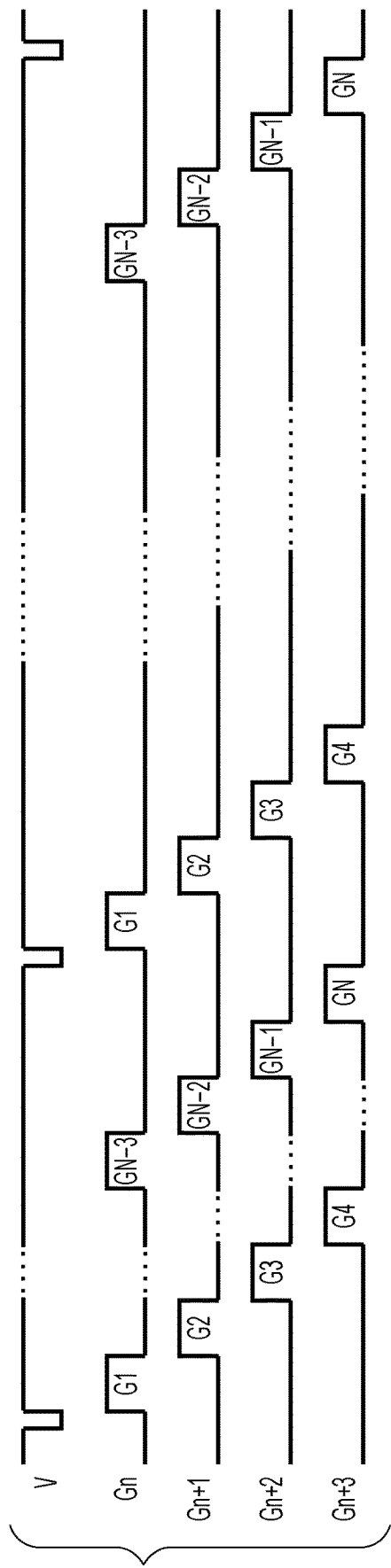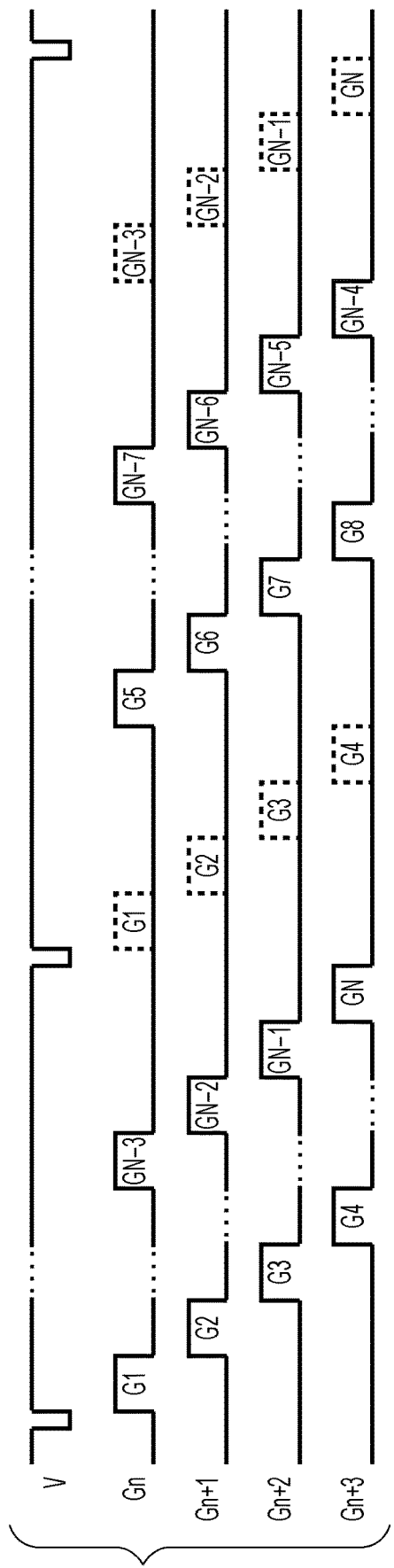

DISPLAY DRIVING DEVICE AND DISPLAY APPARATUS

BACKGROUND

1. Field

The present disclosure relates to a display driving device which drives a display panel.

2. Description of the Related Art

An active matrix-type liquid crystal display apparatus includes a liquid crystal display panel which includes a plurality of source lines and a plurality of scanning lines. In addition, the liquid crystal display apparatus sequentially selects the scanning lines using a gate driver and writes source signals, which are supplied from a source driver, on a plurality of pixels, which are connected to the selected scanning lines, through the source lines in order to drive the liquid crystal display panel.

The liquid crystal display apparatus is mounted on various mobile apparatuses, which have a display function, due to features in which the liquid crystal display apparatus thin and lightweight. Japanese Unexamined Patent Application Publication No. 2000-2856 (published on 7 January, 2000) discloses a liquid crystal display apparatus which is suitably used for, for example, a head mounted display. In addition, Japanese Unexamined Patent Application Publication No. 2000-2856 (published on 7 January, 2000) discloses the liquid crystal display apparatus which is used for the head mounted display and in which high definition is advanced, and discloses that an increase in the number of pixels and a high driving frequency in association with the increase in the number of pixels are demanded for the high definition.

In a state in which a user mounts the head mounted display, a distance between eyes of the user and a display screen of the liquid crystal display apparatus is short and a gaze of the user almost faces directly forward the display screen. In addition, visual fields, which are clearly viewed by eyes of human being, are in a range of 1200 in a horizontal direction and in a range of 700 in a vertical direction. Therefore, it is almost impossible for the user to visually recognize images displayed at ends (right and left ends and upper and lower ends) of the display screen. Accordingly, even in a case where high-definition images are displayed on the display screen, it is not possible for the user to realize that the images displayed at the ends of the display screen are high definition.

In contrast, in a case where the driving frequency is raised in order to advance the high definition of the liquid crystal display apparatus as described above, electric power consumption increases. In addition, in a case where a wireless head mounted display is progressed, it is demanded to supply electric power using batteries, and thus reduction in the electric power consumption is demanded.

However, in a case where the high-definition image is displayed up to a part in which it is not possible for the user to perform visual recognition, as described above, it becomes a problem to reduce the electric power consumption.

It is desirable to reduce electric power consumption of a display apparatus which is suitably used for a head mounted display.

SUMMARY

According to an aspect of the disclosure, there is provided a display driving device including: a drive circuit that drives a display section which selectively supplies pixel signals to a plurality of pixels provided in the display section, in which the display section includes a non-image visual recognition area in which it is not possible for a visual recognizer to visually recognize an image to be displayed, and an image visual recognition area in which it is possible for the visual recognizer to visually recognize the image to be displayed, and in which the drive circuit lowers a driving rate, which drives the non-image visual recognition area, further than a driving rate which drives the image visual recognition area.

BRIEF DESCRIPTION OF THE DRAWINGS

FIG. 7A is a circuit diagram illustrating a state of the output circuit in a certain frame according to a modification example of the first embodiment, and FIG. 7B is a circuit diagram illustrating a state of the output circuit in a subsequent frame;

FIG. 10A is a timing chart illustrating an operation of a gate driver of the liquid crystal display apparatus according to the third embodiment of the disclosure in a certain frame, and FIG. 10B is a timing chart illustrating an operation of the gate driver in a subsequent frame of the certain frame.

DESCRIPTION OF THE EMBODIMENTS

First Embodiment

A first embodiment of the disclosure will be described with reference to FIGS. 1 to 7B as below.

Figure 1:
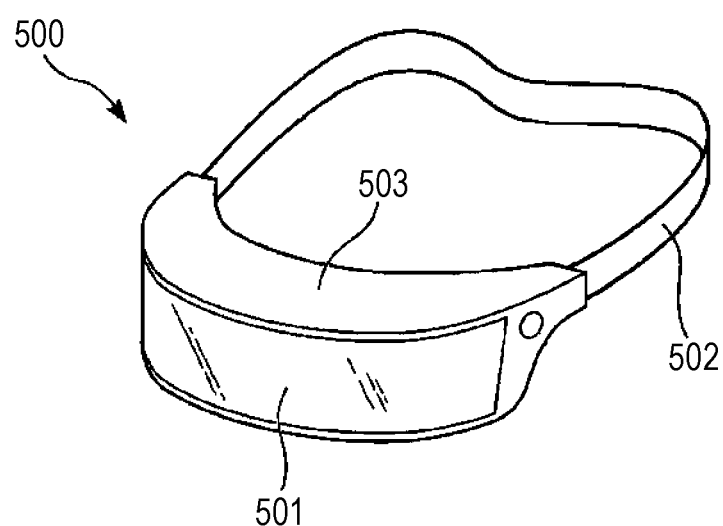
FIG. 1 is a perspective diagram illustrating an appearance configuration of a head mounted display according to first to third embodiments of the disclosure.

First, a configuration of a head mounted display 500 will be described with reference to FIG. 1. FIG. 1 is a perspective diagram illustrating an appearance configuration of the head mounted display 500 according to first to third embodiments.

As illustrated in FIG. 1, the head mounted display 500 is a head-mounted type display which displays a virtual reality image, an augmented reality image, and the like. The head mounted display 500 includes a display apparatus 501, a fixing band 502 (mounting section), and a frame 503.

The display apparatus 501 is provided on a front surface of the frame 503, and displays an image. The fixing band 502 is a band used to mount the frame 503 on the head of the user (visual recognizer).

Figure 2:
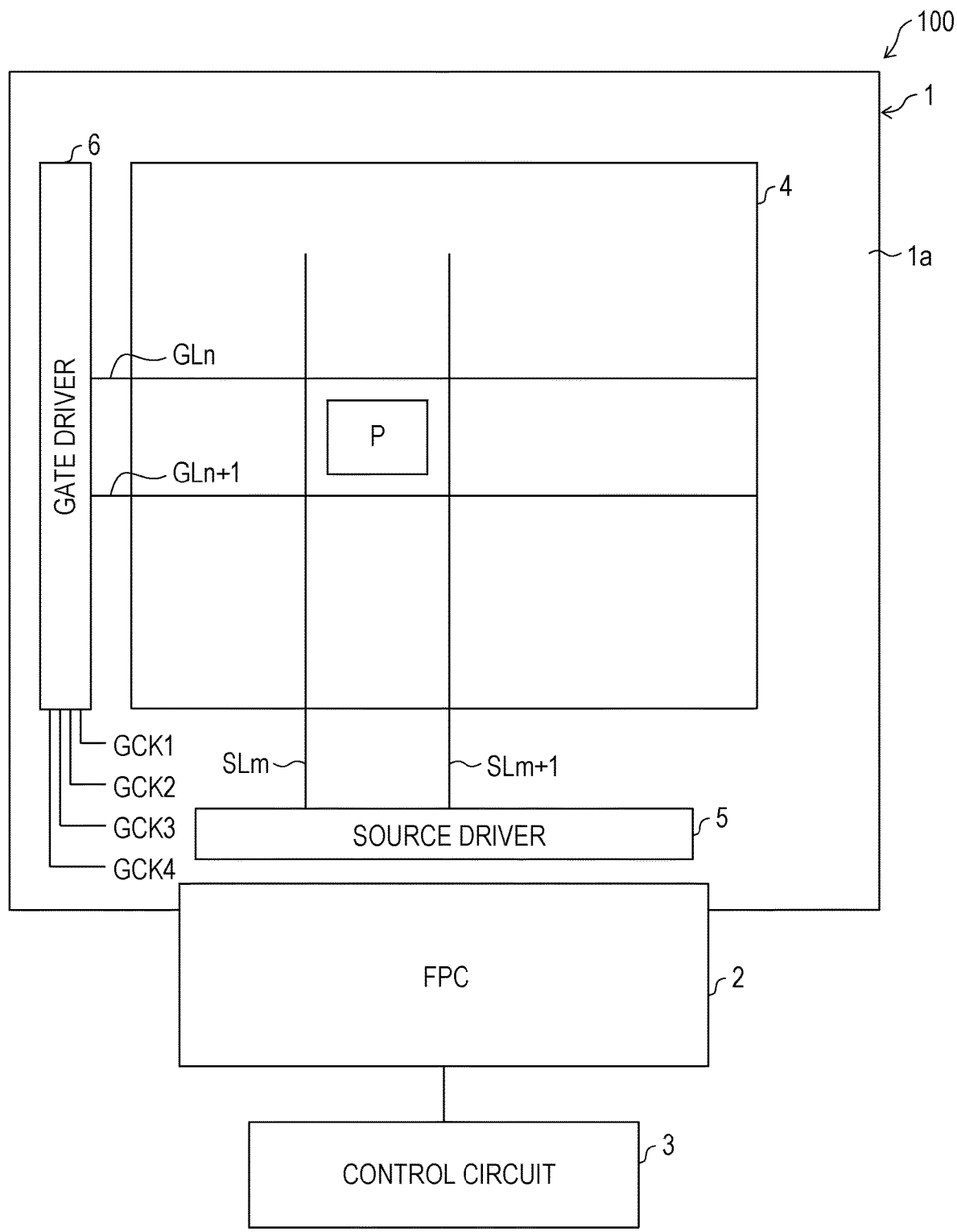
FIG. 2 is a block diagram illustrating a whole configuration of a liquid crystal display apparatus according to the first to third embodiments of the disclosure.
Figure 3:
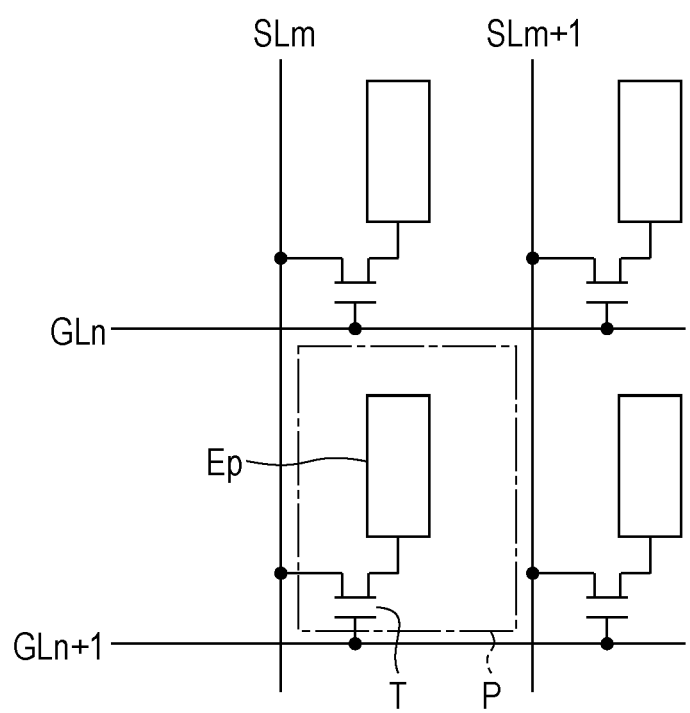
FIG. 3 is a circuit diagram illustrating a configuration of a pixel of the liquid crystal display apparatus.

Subsequently, a configuration of the liquid crystal display apparatus 100 will be described with reference to FIGS. 2 and 3. FIG. 2 is a block diagram illustrating a whole configuration of the liquid crystal display apparatus 100. FIG. 3 is a circuit diagram illustrating a configuration of pixels of the liquid crystal display apparatus 100.

As illustrated in FIG. 2, the liquid crystal display apparatus 100 (display apparatus) includes a liquid crystal display panel 1, a flexible wiring substrate 2, and a control circuit 3. The control circuit 3 is connected to the liquid crystal display panel 1 through the flexible wiring substrate 2. In addition, the liquid crystal display apparatus 100 is provided as the display apparatus 501 in the head mounted display 500.

The liquid crystal display panel 1 is an active matrix type, and controls postures of liquid crystal molecules using Thin Film Transistors (TFT) T illustrated in FIG. 3. The liquid crystal display panel 1 includes a display section 4, a source driver 5, and a gate driver 6.

The display section 4, the source driver 5 (a drive circuit or a signal supply circuit) and the gate driver 6 (a drive circuit and a pixel selection circuit) are formed on an active matrix substrate 1a. The display section 4 is configured in such a way that a liquid crystal is interposed between the active matrix substrate 1a and a counter substrate (not illustrated in the drawing), and includes a plurality of pixels P which are arranged in a matrix shape. In addition, a plurality of source lines SL (SLm, SLm+1, . . . ) and a plurality of gate lines GL (GLn, GLn+1, . . . ) are formed to intersect each other on the active matrix substrate 1a. The source driver 5 is configured using an integrated driver chip and is installed on the active matrix substrate 1a in a form of a Chip On Glass (COG). The gate driver 6 is configured using TFT elements which are formed on the active matrix substrate 1a.

As illustrated in FIG. 3, the source lines SL (signal lines) are formed to be parallel to each other in a column direction (longitudinal direction), and the gate lines GL (selections line) are formed to be parallel to each other in a row direction (lateral direction). The thin film transistor T and a pixel electrode Ep are respectively formed to correspond to each of points with which the source lines SL and the gate lines GL intersect. A source electrode, a gate electrode, and a drain electrode of the thin film transistor T are respectively connected to the source line SL, the gate line GL, and the pixel electrode Ep. In addition, the pixel electrode Ep forms a liquid crystal capacity between the pixel electrode Ep and a common electrode (not illustrated in the drawing). The pixel P is configured using the thin film transistor T, the pixel electrode Ep, the common electrode, and the liquid crystal capacity.

Therefore, in a case where a gate of the thin film transistor T is turned on due to a gate signal supplied to the gate line GL and a source signal (pixel signal) from the source line SL is written in the pixel electrode Ep, potential according to the source signal is given to the pixel electrode Ep. As a result, in a case where the postures of the liquid crystal molecules are controlled by applying a voltage between the pixel electrode Ep and the common electrode according to the source signal, it is possible to express gray scale display according to the source signal.

The liquid crystal display panel 1, which is configured as above, is driven by the source driver 5 and the gate driver 6, which form the display driving device, such that the source signals are selectively supplied to the plurality of pixels P which are provided in the display section 4. In addition, the control circuit 3 supplies various control signals, which are demanded to drive the liquid crystal display panel 1, to the source driver 5 and the gate driver 6.

The source driver 5 outputs the source signals to the respective source lines SL. The source signals are signals used to raise the voltage or the like by assigning image signals, which are supplied from the outside of the liquid crystal display apparatus 100 to the source driver 5 through the control circuit 3, to respective columns in the source driver 5.

The gate driver 6 outputs the gate signals (selection signals) used to line-sequentially select the gate lines GL to be activated. The gate driver 6 outputs the gate signals, in which timing is shifted, to the gate lines GL in respective stages by sequentially transmitting start pulses supplied from the control circuit 3 to subsequent stages.

The gate driver 6 includes a plurality of selection circuits (not illustrated in the drawing), which have the same configuration, in order to output the gate signals. The selection circuits are provided for the respective gate lines GL such that the gate signals used to select the respective gate lines GL are output in order to give the source signals to the plurality of pixels P which are respectively connected to the plurality of gate lines GL. Clock signals CK1 to CK4, in which phases are deviated from each other, are supplied to each of the selection circuits in order to generate timing at which the gate signals are output.

The various control signals, such as the clock signals CK1 to CK4 and the start pulse, are supplied from the control circuit 3.

Here, a state in which an image is visually recognized by the user (visual recognizer) in the head mounted display 500 will be described.

Figure 4:
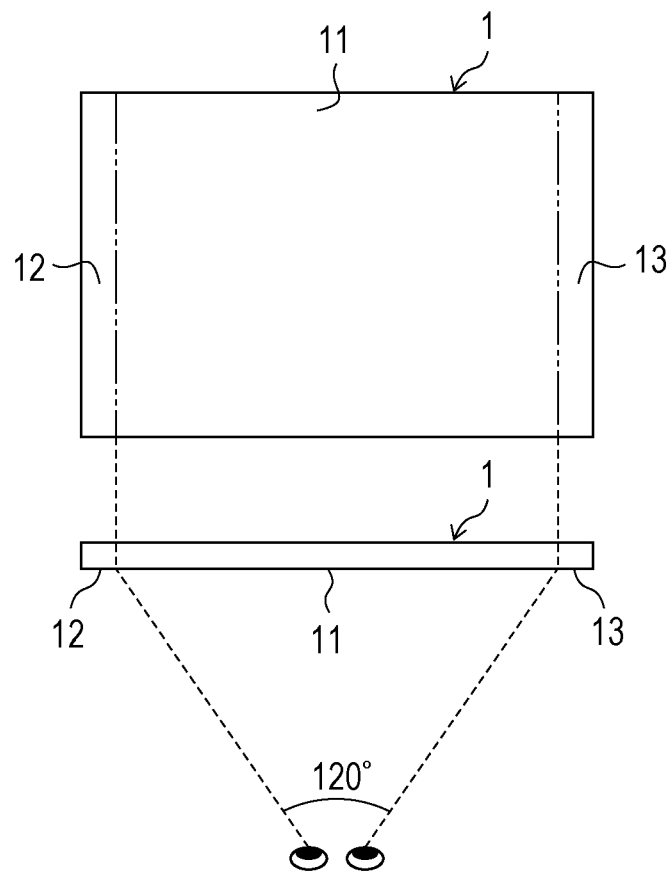
FIG. 4 is a diagram illustrating a first visual recognition area, in which it is possible for a visual recognizer to visually recognize an image displayed on a liquid crystal display panel of the liquid crystal display apparatus in a horizontal direction, and a non-visual recognition area on a left end side and a non-visual recognition area on a right end side, in which it is not possible for the visual recognizer to visually recognize the image in the horizontal direction.
Figure 5:
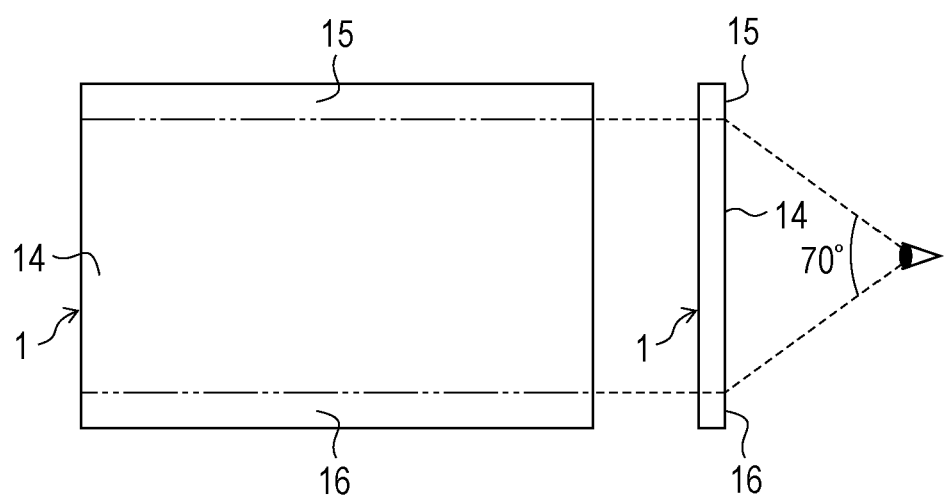
FIG. 5 is a diagram illustrating a second visual recognition area, in which it is possible for the visual recognizer to visually recognize the image displayed on the liquid crystal display panel of the liquid crystal display apparatus in a vertical direction, and a non-visual recognition area on an upper end side and a non-visual recognition area on a lower end side, in which it is not possible for the visual recognizer to visually recognize the image in the vertical direction.

FIG. 4 is a diagram illustrating a first visual recognition area 11, in which it is possible for the user to favorably perform visual recognition in a horizontal direction and a non-visual recognition area 12 on a left end side and a non-visual recognition area 13 on a right end side, in which it is not possible for the visual recognizer to perform the visual recognition in the horizontal direction, in the liquid crystal display panel 1 of the liquid crystal display apparatus 100. FIG. 5 is a diagram illustrating a second visual recognition area 14, in which it is possible for the user to perform the visual recognition in a vertical direction and a non-visual recognition area 15 on an upper end side and a non-visual recognition area 16 on a lower end side, in which it is not possible for the user to perform the visual recognition in the vertical direction, in the liquid crystal display panel 1.

As illustrated in FIG. 4, the liquid crystal display panel 1 is divided into the first visual recognition area 11 (image visual recognition area), the non-visual recognition area 12 on the left end side (non-image visual recognition area), and the non-visual recognition area 13 on the right end side (non-image visual recognition area). The non-visual recognition area 12 on the left end side exists on the left side of the first visual recognition area 11, and the non-visual recognition area 13 on the right end side exists on the right side of the first visual recognition area 11.

In addition, as illustrated in FIG. 5, the liquid crystal display panel 1 is divided into the second visual recognition area 14 (image visual recognition area), the non-visual recognition area 15 on the upper end side (non-image visual recognition area), and the non-visual recognition area 16 on the lower end side (non-image visual recognition area). The non-visual recognition area 15 on the upper end side exists on the upper side of the second visual recognition area 14, and the non-visual recognition area 16 on the lower end side exists on the lower side of the second visual recognition area 14.

In a state in which the user mounts the head mounted display 500, a distance between the display apparatus 501 (liquid crystal display apparatus 100) and eyes is short and a gaze of the user almost faces directly forward. In addition, as described above, generally, visual fields, which are clearly viewed by human eyes, are limited. The visual fields for both eyes are in a range of 1200 in the horizontal direction as illustrated in FIG. 4, and in a range of 70° in the vertical direction as illustrated in FIG. 5. Therefore, even in a case where images, which are displayed at the ends in the horizontal direction and the vertical direction in the display apparatus 501, are in high definition, it is not possible for the user to feel reality.

Specifically, as illustrated in FIG. 4, in the liquid crystal display panel 1, an image displayed in the first visual recognition area 11 is visually recognized well by the user and, since images displayed in the non-visual recognition area 12 on the left end side and the non-visual recognition area 13 on the right end side exist out of the visual fields of the user, the images are not visually recognized well by the user. In addition, as illustrated in FIG. 5, in the liquid crystal display panel 1, an image displayed in the second visual recognition area 14 is visually recognized well by the user and, since the images displayed in the non-visual recognition area 15 on the upper end side and the non-visual recognition area 16 on the lower end side exist out of the visual fields of the user, the images are not visually recognized well by the user.

Therefore, in the liquid crystal display apparatus 100, which is mounted on the head mounted display 500 as the display apparatus 501, it may be said that demands for high resolution and high frequency driving are low for peripheries (the respective non-visual recognition areas 12, 13, 15, and 16) of the liquid crystal display panel 1. In addition the wireless head mounted display 500 demands to be driven using batteries, and thus it is preferable to reduce electric power consumption. Therefore, it is possible to expect the electric power consumption to be suppressed by differentiating a method for driving the peripherals of the liquid crystal display panel 1 from a method for driving a central part (each of the visual recognition areas 11 and 14) of the liquid crystal display panel 1.

In the embodiment, a configuration, in which a method for driving the peripherals of the liquid crystal display panel 1 is differentiated from a method for driving the central part of the liquid crystal display panel 1 in the source driver 5, will be described.

Figure 6B:
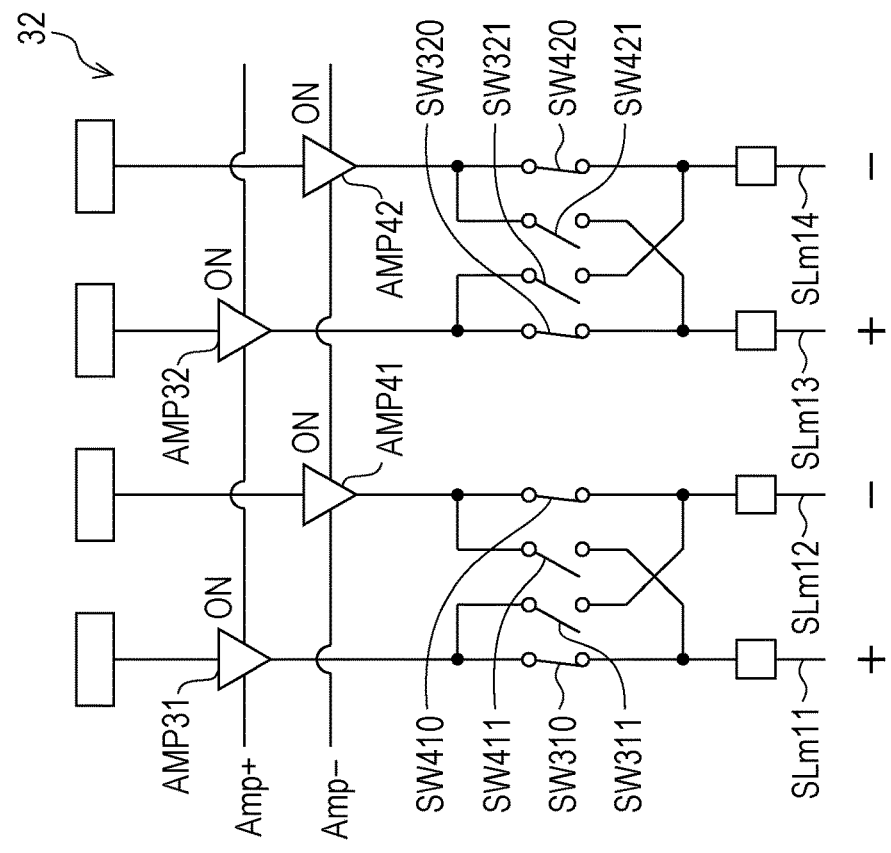
FIG. 6B is a circuit diagram illustrating a configuration of an output circuit of the source driver which supplies the source signals to the first visual recognition area in the liquid crystal display panel.
Figure 6A:
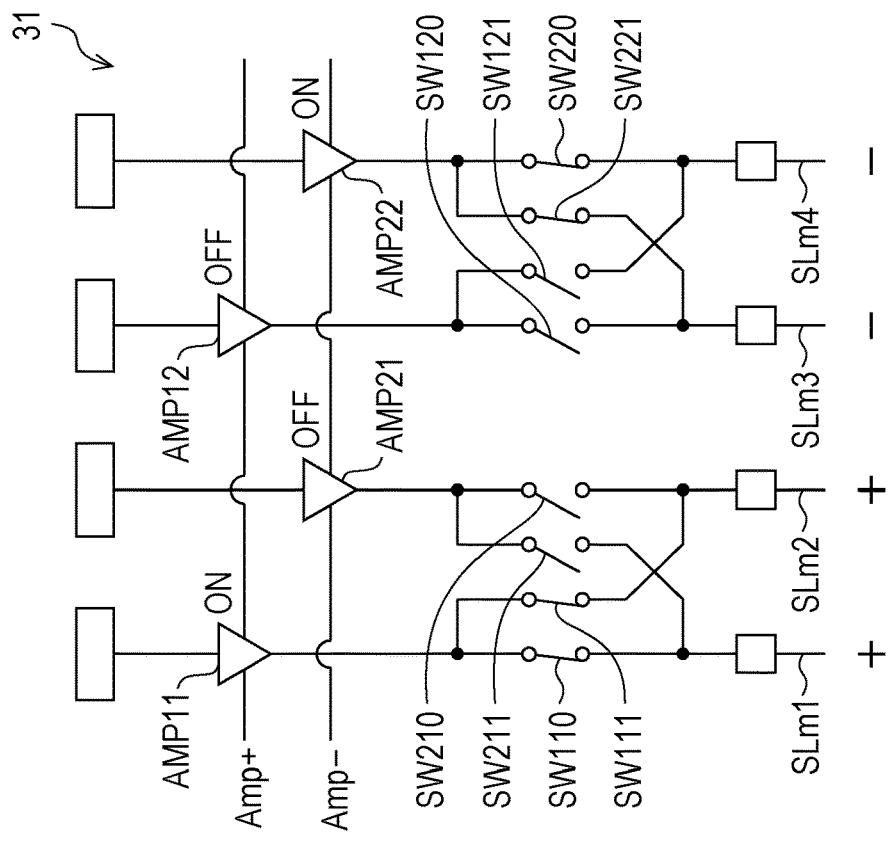
FIG. 6A is a circuit diagram illustrating a configuration of an output circuit of a source driver which supplies source signals to the non-visual recognition area on the left end side and the non-visual recognition area on the right end side in the liquid crystal display panel of the liquid crystal display apparatus according to the first embodiment of the disclosure.

FIG. 6A is a circuit diagram illustrating a configuration of an output circuit 31, which supplies the source signals to the non-visual recognition area 12 on the left end side and the non-visual recognition area 13 on the right end side, of the source driver 5 in the liquid crystal display panel 1, and FIG. 6B is a circuit diagram illustrating a configuration of an output circuit 32, which supplies the source signals to the first visual recognition area, of the source driver 5 in the liquid crystal display panel 1.

As illustrated in FIG. 6A, the output circuit 31 is a circuit which supplies the source signals to the source lines SL disposed in the non-visual recognition area 12 on the left end side and the non-visual recognition area 13 on the right end side, and which is provided in an output stage of the source driver 5. The output circuit 31 includes amplifiers AMP11, AMP12, AMP21, and AMP22 and switches SW110, SW111, SW120, SW121, SW210, SW211, SW220, and SW221.

The amplifiers AMP11, AMP12, AMP21, and AMP22 are amplification circuits which amplify the source signals to be output to respectively relevant source lines SL. The amplifiers AMP11, AMP12, AMP21, and AMP22 are configured using the TFTs.

In an ON state, the amplifiers AMP11 and AMP12 output the source signals without changing polarities. The amplifiers AMP11 and AMP12 become the ON state in a case where an amplification control signal Amp+ to be ON is given, and becomes an OFF state in a case where the amplification control signal Amp+ to be OFF is given.

In an ON state, the amplifiers AMP21 and AMP22 output the source signals by inverting the polarities. The amplifiers AMP21 and AMP22 become the ON state in a case where an amplification control signal Amp- to be ON is given, and becomes the OFF state in a case where the amplification control signal Amp- to be OFF is given.

The switches SW110, SW111, SW120, SW121, SW210, SW211, SW220, and SW221 are two-way switches. The switches SW110, SW111, SW120, SW121, SW210, SW211, SW220, and SW221 are configured using the TFTs.

The switch SW110 is provided between an output terminal of the amplifier AMP11 and a source line SLm1. The switch SW111 is provided between the output terminal of the amplifier AMP11 and a source line SLm2. The switch SW210 is provided between an output terminal of the amplifier AMP21 and the source line SLm2. The switch SW211 is provided between the output terminal of the amplifier AMP21 and the source line SLm1.

The switch SW120 is provided between an output terminal of the amplifier AMP12 and a source line SLm3. The switch SW121 is provided between the output terminal of the amplifier AMP12 and a source line SLm4. The switch SW220 is provided between an output terminal of the amplifier AMP22 and the source line SLm4. The switch SW221 is provided between the output terminal of the amplifier AMP22 and the source line SLm3.

In a case where the source lines SL are driven, the amplifiers AMP11 and AMP22 are turned ON and the amplifiers AMP12 and AMP21 are turned OFF in the certain frame, as illustrated in FIG. 6A. In addition, in the output circuit 31, control is performed such that the switches SW110, SW111 (signal path), SW220, and SW221 (signal path) are closed and the switches SW120, SW121, SW210, and SW211 are open. Therefore, as illustrated in FIG. 6A, positive polarity source signals are simultaneously output to the source lines SLm1 (first signal line) and SLm2 (second signal line), and negative polarity source signals are simultaneously output to the source line SLm3 (second signal line) and SLm4 (first signal line).

In a subsequent frame, the amplifiers AMP11 and AMP22 are turned OFF and the amplifiers AMP12 and AMP21 are turned ON. In addition, control is performed such that the switches SW110, SW111, SW220, and SW221 are open and the switches SW120, SW121 (signal path), SW210, and SW211 (signal path) are close in the output circuit 31. Therefore, the negative polarity source signals are simultaneously output to the source lines SLm1 and SLm2 and the positive polarity source signals are simultaneously output to the source lines SLm3 and SLm4.

In this manner, opening and closing of the switches SW110, SW111, SW120, SW121, SW210, SW211, SW220, and SW221 are switched for each frame, and thus frame-reversal driving is performed.

Signals given to the switches SW110, SW111, SW120, SW121, SW210, SW211, SW220, and SW221 are supplied from the control circuit 3.

In the output circuit 31 as described above, one amplifier AMP11 or AMP21 drives the two source lines SLm1 and SLm2, and one amplifier AMP22 or AMP12 drives the two source lines SLm3 and SLm4. Therefore, it is possible to simultaneously charge two pixels P, which are connected to the two source lines SL and one selected gate line GL, using the source signal which is output from one amplifier AMP. Therefore, it is possible to reduce the number of times that charging is performed in half, compared to the output circuit 32 which is illustrated in FIG. 6B and which will be described later. Accordingly, it is possible to reduce the electric power consumption.

As illustrated in FIG. 6B, the output circuit 32 is a circuit which supplies the source signals to the source lines SL disposed in the first visual recognition area 11, and is provided in the output stage of the source driver 5. The output circuit 32 includes amplifiers AMP31, AMP32, AMP41, and AMP42 and switches SW310, SW311, SW320, SW321, SW410, SW411, SW420, and SW421.

The amplifier AMP31, AMP32, AMP41, and AMP42 are amplification circuits which amplify the source signals to be output to respectively relevant source lines SL. The amplifiers AMP31, AMP32, AMP41, and AMP42 are configured using the TFTs.

In the ON state, the amplifiers AMP31 and AMP32 output the source signals without changing the polarities. The amplifiers AMP31 and AMP32 become the ON states in a case where the amplification control signal Amp+ to be ON is given, and becomes the OFF state in a case where the amplification control signal Amp+ to be OFF is given.

In the ON state, the amplifier AMP41 and AMP42 output the source signals by inverting polarities. The amplifiers AMP41 and AMP42 become the ON state in a case where an amplification control signal Amp- to be ON is given, and becomes the OFF state in a case where the amplification control signal Amp- to be OFF is given.

The switches SW310, SW311, SW320, SW321, SW410, SW411, SW420, and SW421 are two-way switches. The switches SW310, SW311, SW320, SW321, SW410, SW411, SW420, and SW421 are configured using the TFTs.

The switch SW310 is provided between an output terminal of the amplifier AMP31 and a source line SLm11. The switch SW311 is provided between the output terminal of the amplifier AMP31 and a source line SLm12. The switch SW410 is provided between an output terminal of the amplifier AMP41 and the source line SLm12. The switch SW411 is provided between the output terminal of the amplifier AMP41 and the source line SLm11.

The switch SW320 is provided between an output terminal of the amplifier AMP32 and a source line SLm13. The switch SW321 is provided between the output terminal of amplifier AMP32 and a source line SLm14. The switch SW420 is provided between an output terminal of the amplifier AMP42 and the source line SLm14. The switch SW421 is provided between the output terminal of the amplifier AMP42 and the source line SLm13.

In a case where the source lines SL are driven, the amplifiers AMP31, AMP32, AMP41, and AMP42 are turned ON in the certain frame. In addition, in the output circuit 32, control is performed such that the switches SW310, SW320, SW410, and SW420 are close and the switches SW311, SW321, SW411, and SW421 are open. Therefore, as illustrated in FIG. 6B, the positive polarity source signals are separately output to the source lines SLm11 and SLm13, and the negative polarity source signals are separately output to the source line SLm12 and SLm14.

In the subsequent frame, the amplifiers AMP31, AMP32, AMP41, and AMP42 are turned ON, similar to the previous frame. In addition, in the output circuit 32, control is performed such that the switches SW310, SW320, SW410, and SW420 are open and the switches SW311, SW321, SW411, and SW421 are close. Therefore, the negative polarity source signals are separately output to the source lines SLm11 and SLm13, and the positive polarity source signals are separately output to the source lines SLm12 and SLm14.

In this manner, opening and closing of the switches SW310, SW311, SW320, SW321, SW410, SW411, SW420, and SW421 are switched for each frame, and thus the frame-reversal driving is performed.

Signals to be given to the switches SW310, SW311, SW320, SW321, SW410, SW411, SW420, and SW421 are supplied from the control circuit 3.

In the output circuit 32 as described above, one amplifier AMP31, AMP32, AMP41, or AMP42 drives the one source line SLm11, SLm12, SLm13, or SLm14.

As described above, the source driver 5 in the liquid crystal display apparatus 100 according to the first embodiment includes the output circuit 31. Therefore, in the liquid crystal display panel 1, a driving rate used to drive the non-visual recognition area 12 on the left end side and the non-visual recognition area 13 on the right end side is lowered further than a driving rate used to drive the first visual recognition area 11. Therefore, it is possible to reduce electric power consumption generated due to an operation of the source driver 5. Therefore, it is possible to save electric power of the liquid crystal display apparatus 100.

Meanwhile, in the embodiment, the liquid crystal display apparatus 100 is described as an example of the display apparatus. However, it is possible to apply an aspect of the disclosure to another display apparatus in a case of a display apparatus which uses a driving method of line-sequentially selecting the pixels P disposed in the matrix shape as described above in order to give the pixel signals.

Modification Example

Subsequently, a modification example of the first embodiment will be described.

FIG. 7A is a circuit diagram illustrating a state of an output circuit 33 in the certain frame according to the modification example of the first embodiment, and FIG. 7B is a circuit diagram illustrating a state of the output circuit 33 in the subsequent frame.

The output circuit 33 is a circuit which supplies the source signals to the source lines SL disposed in the non-visual recognition area 12 on the left end side and the non-visual recognition area 13 on the right end side. As illustrated in FIG. 7A, the output circuit 33 is provided in the output stage of the source driver 5, and includes the amplifiers AMP11 and AMP22 and the switches SW110, SW111, SW120, SW121, SW210, SW211, SW220, and SW221.

The switch SW110 is provided between the output terminal of the amplifier AMP11 and the source line SLm1, similar to the switch SW110 in the circuit illustrated in FIG. 6A. The switch SW111 is provided between the output terminal of the amplifier AMP11 and the source line SLm2, similar to the switch SW111 in the circuit illustrated in FIG. 6A. The switch SW210 is provided between the output terminal of the amplifier AMP22 and the source line SLm2. The switch SW211 is provided between the output terminal of the amplifier AMP22 and the source line SLm1.

The switch SW120 is provided between the output terminal of the amplifier AMP11 and the source line SLm3. The switch SW121 is provided between the output terminal of the amplifier AMP11 and the source line SLm4. The switch SW220 is provided between the output terminal of the amplifier AMP22 and the source line SLm4, similar to the switch SW220 in the circuit illustrated in FIG. 6A. The switch SW221 is provided between the output terminal of the amplifier AMP22 and the source line SLm3, similar to the switch SW221 in the circuit illustrated in FIG. 6A.

In a case where the source lines SL are driven, the amplifiers AMP11 and AMP22 are turned ON in the certain frame, as illustrated in FIG. 7A. In addition, in the output circuit 33, control is performed such that the switches SW110, SW111, SW220, and SW221 are close and the switches SW120, SW121, SW210, and SW211 are open. Therefore, the positive polarity source signals are output to the source lines SLm1 and SLm2, and the negative polarity source signals are output to the source lines SLm3 and SLm4.

In the subsequent frame, the amplifiers AMP11 and AMP22 are turned ON similar to the previous frame, as illustrated in FIG. 7B. In addition, in the output circuit 33, control is performed such that the switches SW110, SW111, SW220, and SW221 are open and the switches SW120, SW121, SW210, and SW211 are close. Therefore, the negative polarity source signals are output to the source lines SLm1 and SLm2, and the positive polarity source signals are output to the source lines SLm3 and SLm4.

In this manner, the opening and closing of the switches SW110, SW111, SW120, SW121, SW210, SW211, SW220, and SW221 are switched for each frame, and thus the frame-reversal driving is performed.

The output circuit 33 does not include the amplifiers AMP12 and AMP21, compared to the above-described output circuit 31. Therefore, it is possible to simplify a circuit configuration of the output circuit 33.

Second Embodiment

A second embodiment of the disclosure will be described with reference to FIGS. 1, 2, 5, 8, and 9 as below. Meanwhile, for convenience of explanation, the same reference symbols are attached to components which have the same functions as the components that are described in the first embodiment, and the description thereof will not be repeated.

In the first embodiment, a configuration, in which the source driver 5 supplies the same source signal to the non-visual recognition area 12 on the left end side and the non-visual recognition area 13 on the right end side, is described. In contrast, in the second embodiment, a configuration, in which the gate driver 6 supplies the same gate signal to the non-visual recognition area 15 on the upper end side and the non-visual recognition area 16 on the lower end side, will be described.

Figure 8:
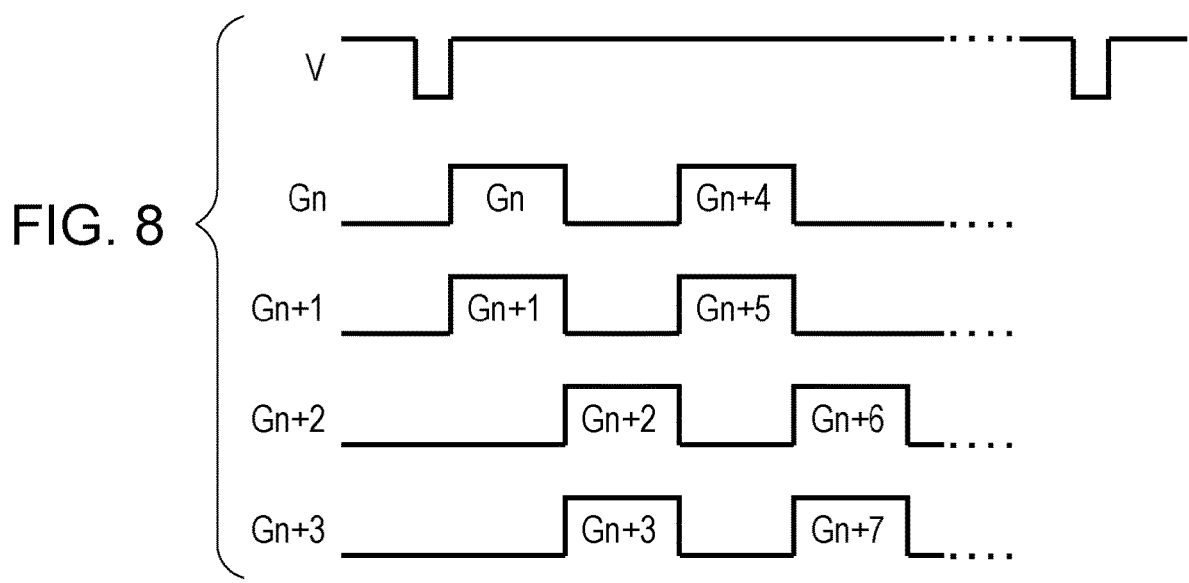
FIG. 8 is a timing chart illustrating an operation of a gate driver of a liquid crystal display apparatus according to the second embodiment of the disclosure.
Figure 9:
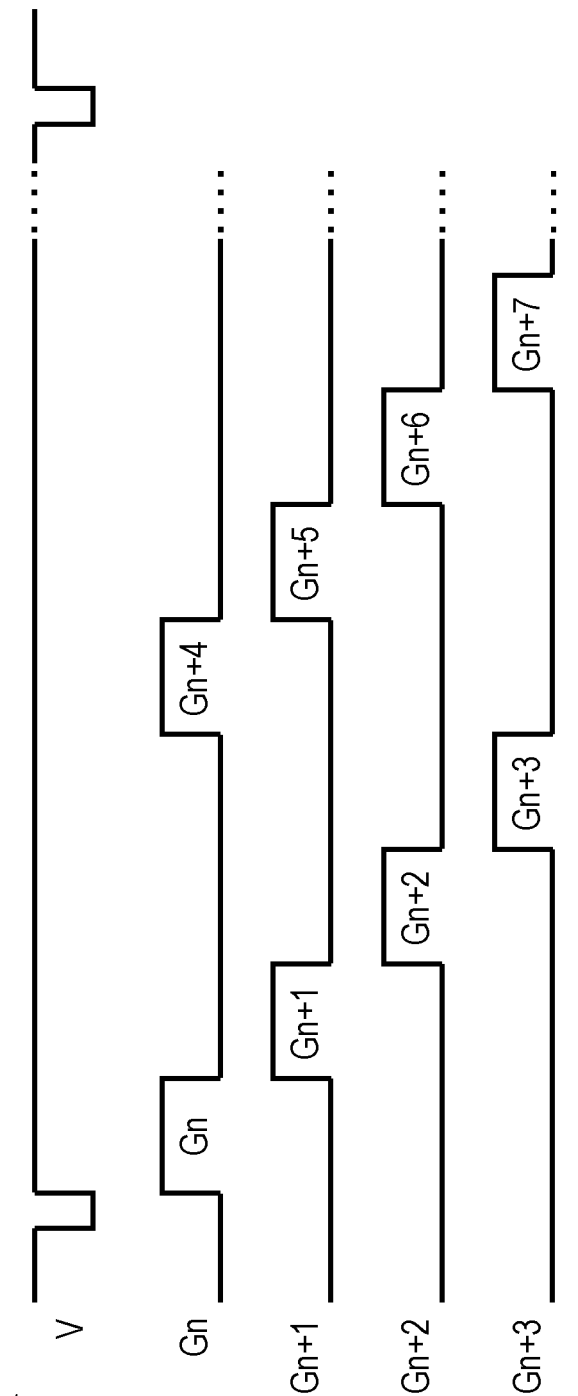
FIG. 9 is a timing chart illustrating an operation of a gate driver of a general liquid crystal display apparatus according to a comparison example of the second embodiment.

FIG. 8 is a timing chart illustrating an operation of the gate driver 6 of the liquid crystal display apparatus 100 according to the second embodiment. FIG. 9 is a timing chart illustrating an operation of a gate driver of a general liquid crystal display apparatus according to a comparison example of the second embodiment.

The liquid crystal display apparatus 100 according to the second embodiment illustrated in FIG. 2 is also mounted on the head mounted display 500 illustrated in FIG. 1, similar to the liquid crystal display apparatus 100 according to the first embodiment.

In the gate driver 6 illustrated in FIG. 2, the selection circuits, which supply the gate signals to the gate lines GL in the non-visual recognition area 15 on the upper end side and the non-visual recognition area 16 on the lower end side that are illustrated in FIG. 5, output the gate signals at the same timing (phase) to the gate lines GL. The control signals at the same timing are input to the selection circuits in order to output the gate signals at the same timing.

In addition, in the gate driver 6, the respective selection circuits, which supply the gate signals to the gate lines GL of the second visual recognition area 14 illustrated in FIG. 5, output the gate signals at timing which is delayed by one pulse further than the gate signals that are output from previous selection circuits at a time.

Therefore, as illustrated in FIG. 8, during one vertical synchronizing period which is defined using a vertical synchronizing signal V, gate signals Gn and Gn+1 at the same timing are respectively supplied to two gate lines GLn and GLn+1 which are adjacent to the non-visual recognition area 15 on the upper end side and the non-visual recognition area 16 on the lower end side. In addition, gate signals Gn+2 and Gn+3 at the same timing are respectively supplied to two gate lines GLn+2 and GLn+3, which are adjacent to the non-visual recognition area 15 on the upper end side and the non-visual recognition area 16 on the lower end side, at timing which is delayed by one pulse further than the gate signals Gn and Gn+1. In addition, gate signals Gn+4 and Gn+5 at the same timing are respectively supplied to two other gate lines GLn+4 and GLn+5, which are adjacent to the non-visual recognition area 15 on the upper end side and the non-visual recognition area 16 on the lower end side, at timing which is delayed by one pulse further than the gate signals Gn+2 and Gn+3. Furthermore, gate signals Gn+6 and Gn+7 at the same timing are respectively supplied to two gate lines GLn+6 and GLn+7, which are adjacent to the non-visual recognition area 15 on the upper end side and the non-visual recognition area 16 on the lower end side, at timing which is delayed by one pulse further than the gate signals Gn+4 and Gn+5.

In contrast, in the gate driver in the general liquid crystal display apparatus, the selection circuits, which supply the gate signals to the gate lines GL of the non-visual recognition area 15 on the upper end side and the non-visual recognition area 16 on the lower end side, output the gate signals at timing which is delayed by one pulse further than the previous gate signals that are output from the selection circuits at a time. Therefore, as illustrated in FIG. 9, during one vertical synchronizing period, the respective gate signals Gn to Gn+3 at timing which is delayed by one pulse at a time are supplied to the four gate lines GLn to Gn+3 which are adjacent to the non-visual recognition area 15 on the upper end side and the non-visual recognition area 16 on the lower end side.

As described above, the gate driver 6 according to the second embodiment outputs the gate signals at the same timing to the two gate lines GL which are adjacent to the non-visual recognition area 15 on the upper end side and the non-visual recognition area 16 on the lower end side. Therefore, the number of times (driving rate), in which the gate signals are switched with respect to the respective gate lines GL in the non-visual recognition area 15 on the upper end side and the non-visual recognition area 16 on the lower end side, is reduced in half, compared to the same number of times acquired by the gate driver according to the related art. Therefore, it is possible to reduce the number of data of the control signals in the control circuit 3. Accordingly, it is possible to reduce the electric power consumption of the liquid crystal display apparatus 100.

Meanwhile, the configuration according to the second embodiment may be combined with the configuration according to the above-described first embodiment. In a case where the configuration according to the second embodiment is combined with the configuration according to the first embodiment, it is possible to increase an effect of reducing the electric power consumption.

Third Embodiment

A third embodiment of the disclosure will be described with reference to FIGS. 1, 2, 5, and 10 as below. Meanwhile, for convenience of explanation, the same reference symbols are attached to components which have the same functions as the components that are described in the first and second embodiments, and the description thereof will not be repeated.

In the first embodiment, a configuration, in which the source driver 5 supplies the same source signal to the non-visual recognition area 12 on the left end side and the non-visual recognition area 13 on the right end side, is described. In contrast, in the third embodiment, a configuration, in which the gate driver 6 thins out and supplies the gate signal to the non-visual recognition area 15 on the upper end side and the non-visual recognition area 16 on the lower end side, will be described.

FIG. 10A is a timing chart illustrating an operation of a gate driver 6 of a liquid crystal display apparatus 100 according to the third embodiment of the disclosure in a certain frame. FIG. 10B is a timing chart illustrating an operation of the gate driver 6 in a subsequent frame of the certain frame.

The liquid crystal display apparatus 100, illustrated in FIG. 2, according to the third embodiment is mounted on the head mounted display 500 illustrated in FIG. 1, similar to the liquid crystal display apparatus 100 according to the first embodiment.

The gate driver 6 illustrated in FIG. 2 supplies the gate signals to the gate lines GL of the non-visual recognition area 15 on the upper end side and the non-visual recognition area 16 on the lower end side, which are illustrated in FIG. 5, in a case where the certain frame is displayed, and does not supply the gate signals to the same gate lines GL in a case where the subsequent frame is displayed. In addition, the gate driver 6 supplies the gate signals to the gate lines GL of the second visual recognition area 14, which is illustrated in FIG. 5, in a case where all the frames are displayed.

Therefore, as illustrated in FIG. 10A, during one vertical synchronizing period (certain frame) defined using the vertical synchronizing signal V, the gate driver 6 outputs the gate signals G1 to GN to all the gate lines GL1 to GLN at timing (a frequency of 120 Hz) which is delayed by one pulse at a time. In addition, as illustrated in FIG. 10B, in the subsequent frame of the frame, the gate driver 6 does not supply the gate signals G1 to G4 and GN−3 to GN to the non-visual recognition area 15 on the upper end side and the non-visual recognition area 16 on the lower end side, respectively, and supplies the gate signals G5 to GN−4 to the gate lines GL5 to GLN−4 of the second visual recognition area 14, respectively.

In this manner, in the two adjacent frames, the gate driver 6 repeats supply and suspension of the supply of the gate signals G1 to G4 and GN−3 to GN to the gate lines GL1 to GL4 and GLN−3 to GLN, alternately, as described above. In addition, the gate driver 6 usually supplies the respective gate signals G5 to GN−4 to the gate lines GL5 to GLN−4, as described above. Therefore, the gate driver 6 supplies the gate signals G5 to GN−4 with respect to the gate lines GL5 to GLN−4 of the second visual recognition area 14 at a prescribed frequency (for example, 120 Hz). In addition, the gate driver 6 supplies the gate signals G1 to G4 and GN−3 to GN with respect to the gate lines GL1 to GL4 and GLN−3 to GLN of the non-visual recognition area 15 on the upper end side and the non-visual recognition area 16 on the lower end side at a half (for example, 60 Hz) of the prescribed frequency. Therefore, in a case where a driving frequency of the gate driver 6 is lowered in the non-visual recognition area 15 on the upper end side and the non-visual recognition area 16 on the lower end side, the driving rate is reduced. Accordingly, it is possible to reduce the electric power consumption of the gate driver 6, and, furthermore, the electric power consumption of the liquid crystal display apparatus 100.

Meanwhile, the driving frequency of the gate driver 6 with respect to the non-visual recognition area 15 on the upper end side and the non-visual recognition area 16 on the lower end side is not limited to the half of the prescribed frequency as described above, and may be, for example, ¾ (for example, 90 Hz) of the prescribed frequency. In other words, the gate driver 6 does not select the gate lines GL in the non-visual recognition area 15 on the upper end side and the non-visual recognition area 16 on the lower end side in a plurality of frame periods.

Meanwhile, a configuration of the third embodiment may be combined with the configuration of the above-described first embodiment. In a case where the configuration of the third embodiment is combined with the configuration of the first embodiment, it is possible to increase the effect of reducing the electric power consumption.

CONCLUSION

According to a first aspect of the disclosure, the display driving device includes a drive circuit (the source driver 5 and the gate driver 6) that drives the display section 4 which selectively supplies pixel signals to the plurality of pixels P provided in the display section 4. The display section 4 includes the non-image visual recognition area (the non-visual recognition area 12 on the left end side, the non-visual recognition area 13 on the right end side, the non-visual recognition area 15 on the upper end side, and the non-visual recognition area 16 on the lower end side), in which it is not possible for the visual recognizer to visually recognize an image to be displayed, and an image visual recognition area (the first visual recognition area 11 and the second visual recognition area 14) in which it is possible for the visual recognizer to visually recognize the image to be displayed. The drive circuit lowers the driving rate, which drives the non-image visual recognition area, further than a driving rate which drives the image visual recognition area.

According to the configuration, the driving rate with respect to the non-image visual recognition area is lowered further than the driving rate with respect to the image visual recognition area, and thus it is possible to reduce the electric power consumption which is generated due to an operation of the drive circuit. Accordingly, it is possible to save the electric power of the display driving device.

According to a second aspect of the disclosure, in the display driving device according to the first aspect, the drive circuit is a signal supply circuit (the source driver 5) which is provided in the display section 4 in order to supply the pixel signals to a plurality of signal lines (the source lines SLm1 to SLm4) to which the pixels are connected, and may simultaneously supply the same pixel signals to the plurality of signal lines in the non-image visual recognition area (non-visual recognition area 12 on the left end side and the non-visual recognition area 13 on the right end side) and may separately supply the pixel signals according to the image to the signal lines in the image visual recognition area.

According to the configuration, in a case where the pixel signal is simultaneously supplied to the plurality of signal lines of the non-image visual recognition area, it is possible to reduce the number of times that the pixel signals are supplied to the signal lines further than the number of times that the pixel signals according to the image are separately supplied to the respective signal lines in the image visual recognition area. Therefore, the driving rate with respect to the non-image visual recognition area is lowered further than the driving rate with respect to the image visual recognition area. Therefore, it is possible to reduce the electric power consumption which is generated due to an operation of the signal supply circuit. Accordingly, it is possible to save the electric power of the display driving device.

According to a third aspect of the disclosure, in the display driving device according to the second aspect, for a first signal line and a second signal line which are two adjacent signal lines, the signal supply circuit may include a signal path used to supply the pixel signals, which are supplied to the first signal line, to the second signal line.

According to the configuration, it is possible to simultaneously supply the pixel signals to the plurality of signal lines of the non-image visual recognition area.

According to a fourth embodiment of the disclosure, in the display driving device in any one of the first to third aspects, the drive circuit is a pixel selection circuit (the gate driver 6) that selects the pixels P, to which the pixel signals are given, from the plurality of pixels P that are provided in the display section 4 and are respectively connected to the plurality of signal lines to which the pixel signals are supplied, by supplying the selection signals to the selection lines (gate lines GLn, GLn+1, . . . ) to which the pixels P connected to the respective signal lines are connected, may simultaneously select the pixels P, which are connected to the plurality of selection lines in the non-image visual recognition area (non-visual recognition area 15 on the upper end side and the non-visual recognition area 16 on the lower end side), and may line-sequentially select the pixels P connected to the respective selection lines in the image visual recognition area (second visual recognition area 14).

According to the configuration, in a case where the pixels connected to the plurality of selection lines in the non-image visual recognition area are simultaneously selected, it is possible to reduce the number of times that the selection signals are supplied to the selection lines further than the number of times that the selection signals used to line sequentially select the pixels in the respective selection lines in the image visual recognition area are supplied for each selection line. Therefore, the driving rate with respect to the non-image visual recognition area is lowered than the driving rate with respect to the image visual recognition area. Therefore, it is possible to reduce the electric power consumption generated due to the operations of the pixel selection circuits. Accordingly, it is possible to save the electric power of the display driving device.

According to a fifth aspect of the disclosure, in the display driving device according to any one of the first to third aspects, the drive circuit is a pixel selection circuit (the gate driver 6) that selects the pixels P, to which the pixel signals are given, from the plurality of pixels P that are provided in the display section 4 and are respectively connected to the plurality of signal lines to which the pixel signals are supplied, by supplying selection signals to the selection lines (gate lines GLn and GLn+1) to which the pixels P connected to the respective signal lines are connected, may not select the pixels connected to the plurality of selection lines in the non-image visual recognition area (the non-visual recognition area 15 on the upper end side and the non-visual recognition area 16 on the lower end side) in the plurality of frame periods, and may select the pixels P connected to the respective selection lines in the image visual recognition area (second visual recognition area 14) in each frame.

According to the configuration, in a case where the pixels, which are connected to the plurality of selection lines in the non-image visual recognition area, are selected in the plurality of frame periods, it is possible to reduce the number of times that the selection signals are supplied to the selection lines further than the number of times that the selection signals used to line sequentially select the pixels in the respective selection lines in the image visual recognition area are supplied for each selection line. Therefore, the driving rate with respect to the non-image visual recognition area is lowered than the driving rate with respect to the image visual recognition area. Therefore, the driving rate with respect to the non-image visual recognition area is lowered than the driving rate with respect to the image visual recognition area. Therefore, it is possible to reduce the electric power consumption generated due to the operations of the pixel selection circuits. Accordingly, it is possible to save the electric power of the display driving device.

According to a sixth aspect of the disclosure, the display apparatus includes the display driving device according to any one of the first to fifth aspects, and the display section 4 which includes the plurality of pixels P.

According to a seventh aspect of the disclosure, the display apparatus further includes a mounting section used to mount the display apparatus according to the sixth aspect on the head of the visual recognizer, and the display section 4 may display the image which is visually recognized by the visual recognizer.

The disclosure is not limited to the above-described respective embodiments, various modifications are possible in a scope disclosed in claims, and embodiments, which are acquired by appropriately combining technical units that are respectively disclosed in different embodiments, are included in a technical scope of the disclosure. Furthermore, it is possible to form new technical features by combining the technical units that are respectively disclosed in the respective embodiments are combined.

The present disclosure contains subject matter related to that disclosed in Japanese Priority Patent Application JP 2017-194503 filed in the Japan Patent Office on Oct. 4, 2017, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A display driving device comprising:
    a drive circuit that drives a display section which selectively supplies pixel signals to a plurality of pixels provided in the display section,
    wherein the display section includes a non-image visual recognition area in which it is not possible for a visual recognizer to visually recognize an image to be displayed, and an image visual recognition area in which it is possible for the visual recognizer to visually recognize the image to be displayed,
    wherein the drive circuit lowers a driving rate, which drives the non-image visual recognition area, further than a driving rate which drives the image visual recognition area,
    the drive circuit includes:
        a signal supply circuit which is provided in the display section in order to supply the pixel signals to a plurality of signal lines to which the pixels are connected,
        the drive circuit simultaneously supplies the same pixel signals to the plurality of signals lines in the non-image visual recognition area, and separately supplies the pixel signals according to the image to the signal lines in the image visual recognition area, and
        in the non-image visual recognition area, for a first signal line, a second signal line, a third signal line, and a fourth signal line which are four adjacent signal lines, the signal supply circuit includes a signal path which is used to supply the same pixel signals, which are supplied to the first signal line and the second signal line, also to the third signal line and the fourth signal line.

2. The display driving device according to claim 1,
    wherein the drive circuit includes a pixel selection circuit that selects the pixels, to which the pixel signals are given, from the plurality of pixels that are provided in the display section and are respectively connected to a plurality of signal lines to which the pixel signals are supplied, by supplying selection signals to selection lines to which the pixels connected to the respective signal lines are connected, and
    wherein the drive circuit simultaneously selects the pixels, which are connected to the plurality of selection lines in the non-image visual recognition area, and line-sequentially selects the pixels connected to the respective selection lines in the image visual recognition area.

3. The display driving device according to claim 1,
    wherein the drive circuit includes a pixel selection circuit that selects the pixels, to which the pixel signals are given, from the plurality of pixels that are provided in the display section and are respectively connected to a plurality of signal lines to which the pixel signals are supplied, by supplying selection signals to selection lines to which the pixels connected to the respective signal lines are connected, and
    wherein the drive circuit does not select the pixels connected to the plurality of selection lines in the non-image visual recognition area in a plurality of frame periods, and selects the pixels connected to the respective selection lines in the image visual recognition area in each frame.

4. A display apparatus comprising:
    the display driving device according to claim 1; and
    a display section that includes the plurality of pixels.

5. The display apparatus according to claim 4, further comprising:
    a mounting section that is used to mount the display apparatus on a head of a visual recognizer,
    wherein the display section displays an image which is visually recognized by the visual recognizer.

* * * * *